(12) United States Patent
Facon et al.

(10) Patent No.: US 10,990,663 B2
(45) Date of Patent: Apr. 27, 2021

(54) KEY GENERATION FROM AN IMAGING SENSOR

(71) Applicant: SECURE-IC SAS, Desson-Sévigné (FR)

(72) Inventors: Adrien Facon, Paris (FR); Sylvain Guilley, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 308 days.

(21) Appl. No.: 16/161,324

(22) Filed: Oct. 16, 2018

(65) Prior Publication Data

US 2019/0121955 A1    Apr. 25, 2019

(30) Foreign Application Priority Data

Oct. 20, 2017    (EP) .................................... 17306439

(51) Int. Cl.
| | |
|---|---|
| *G06F 21/45* | (2013.01) |
| *H04L 9/08* | (2006.01) |
| *H04L 9/32* | (2006.01) |
| *H04N 17/00* | (2006.01) |

(52) U.S. Cl.
CPC ............ *G06F 21/45* (2013.01); *H04L 9/0866* (2013.01); *H04L 9/3278* (2013.01); *H04N 17/002* (2013.01); *H04L 9/0861* (2013.01)

(58) Field of Classification Search
CPC ..... G06F 21/45; H04L 9/0866; H04L 9/3278; H04L 9/0861; H04N 17/002
USPC .......................................................... 726/18
See application file for complete search history.

(56) References Cited

U.S. PATENT DOCUMENTS

| | | | |
|---|---|---|---|
| 6,233,339 B1* | 5/2001 | Kawano | G06Q 20/40975 380/44 |
| 2010/0199092 A1* | 8/2010 | Andrus | H04L 9/0844 713/171 |
| 2015/0199552 A1 | 7/2015 | Du | |

OTHER PUBLICATIONS

European Search Report for 17306439.5 dated Feb. 15, 2018.
(Continued)

*Primary Examiner* — Michael S McNally
(74) *Attorney, Agent, or Firm* — Meagher Emanuel; Laks Goldberg & Liao, LLP

(57) ABSTRACT

There is disclosed a method of handling a sensor, comprising the steps of: challenging a subset of sensor components under uniform conditions; receiving output signal values from said subset; for each component, determining the statistical moment of order i of the temporal distribution of the output signal value of said each sensor component; and determining one or more pathological sensor components whose sum of the distances of values to other components of the subset is greater than a threshold, the distance between two sensor components being determined by the difference of the $i^{th}$ statistical moment values of the two temporal distributions associated to the components obtained when challenging said subset under uniform conditions. Described developments comprise the use of imaging sensors, key or identifier generation, authentication mechanisms, determination of thresholds, use of helper data files, adjustments of light sources and/or beam shaping, handling of lossy compression and of videos.

15 Claims, 3 Drawing Sheets

(56) References Cited

OTHER PUBLICATIONS

Cao Yuan et al: "CMOS Image Sensor Based Physical Unclonable Function for Coherent Sensor-Level Authentication", IEEE Transactions on Circuits and Systems I: Regular Papers, IEEE, US, vol. 62, No. 11, Nov. 1, 2015 (Nov. 1, 2015), pp. 2629-2640.

Georgios Selimis et al: "Evaluation of 90nm 6T-SRAM as Physical Unclonable Function for secure key generation in wireless sensor nodes", Circuits and Systems (ISCAS), 2011 IEEE International Symposium on, IEEE, May 15, 2011 (May 15, 2011), pp. 567-570.

\* cited by examiner $$\forall (i,j) \in \Omega, E_{i,j} = \int_0^{T_{int}} e_{i,j}(t)\, dt = E_\Omega \text{ independant of } (i,j) \quad /^{310}$$

KEY GENERATION FROM AN IMAGING SENSOR

TECHNICAL FIELD

This invention generally relates to the field of digital data processing and more particularly to methods and systems for key generation from an imaging sensor.

BACKGROUND

Imaging sensors such as cameras or displays are now widespread in consumer electronics devices such as smartphones, computer devices, Internet of Things (IoT) devices or the like.

Few known approaches are directed towards the security of such sensors. Some existing approaches describe how to use cameras and/or displays to authenticate users. An imaging sensor is rarely considered for itself.

These existing approaches present limitations.

In particular, there is a need for methods and systems to generate reliably a credential such as an identifier or key from an imaging sensor.

SUMMARY

There is disclosed a method of handling a sensor, comprising the steps of: challenging a subset of sensor components under uniform conditions; receiving output signal values from said subset; for each component, determining the statistical moment of order i of the temporal distribution of the output signal value of said each sensor component; and determining one or more pathological sensor components whose sum of the distances of values to other components of the subset is greater than a threshold, the distance between two sensor components being determined by the difference of the $i^{th}$ statistical moment values of the two temporal distributions associated to the components obtained when challenging said subset under uniform conditions. Described developments comprise the use of imaging sensors, key or identifier generation, authentication mechanisms, determination of thresholds, use of helper data files, adjustments of light sources and/or beam shaping, handling of lossy compression and of videos.

There is also disclosed a computer-implemented method of handling an imaging sensor comprising a plurality of pixels, comprising the steps of: defining a subset of pixels; taking N images while challenging said subset of pixels under uniform conditions; receiving output signals; manipulating statistical moments of the temporal distribution of the signals of the pixels of the N taken images, and determining one or more pathological pixels presenting specific statistical properties with respect to other pixels of the subset. Described developments comprise key or identifier generation from the pathological pixels, authentication mechanisms, determination of thresholds, use of helper data files, shutter manipulations, adjustments of light sources and/or beam shaping, handling of lossy compression and of videos.

In an embodiment, there is disclosed a computer-implemented method of handling an imaging sensor comprising a plurality of pixels, the method comprising the steps of: defining a subset of pixels of the imaging sensor; taking N images while challenging said subset of pixels under spatially uniform conditions; receiving output signals from said subset of pixels; for each pixel of the subset of pixels, determining the statistical moment of order i of the temporal distribution of the signals of said each pixel for the N taken images; determining one or more pathological pixels, said pathological pixels being pixels whose sum of the distances to all the other pixels of the subset is superior to a threshold, the distance between two pixels being determined by the difference of the $i^{th}$ statistical moment values of the two temporal distributions associated to the pixels obtained when taking the N images.

In an embodiment, for i=1, there is disclosed a computer-implemented method of handling an imaging sensor comprising a plurality of pixels, the method comprising the steps of: defining a subset of pixels of the imaging sensor; taking N images while challenging said subset of pixels under spatially uniform conditions; receiving output signals from said subset of pixels; for each pixel of the subset of pixels, determining the statistical moment of order i of the temporal distribution of the signals of said each pixel for the N taken images; determining one or more pathological pixels, said pathological pixels being pixels whose sum of the statistical distances to other pixels of the subset is superior to a threshold, the statistical distance being determined between temporal distributions of signals of pixels of the subset of pixels.

Advantageously, residual and irreducible flaws of a manufactured imaging sensor can be leveraged for key generation.

Advantageously, the generated key is hardware-enabled. For example, one or more hardware components can be used (e.g. circuits). The generated key or credential or identifier can be unique due to properties of the underlying hardware components. The generated key is reliable (to some extent, the property of reliability of the key can be ensured or controlled). A same key (modulo a fixed acceptable or predefined error rate) can be obtained when repeatedly generated.

Advantageously, embodiments of the invention leverage i.e. exploit the very high number of pixels which are addressable in commercialized image sensors. Experimental data has shown that a sufficient number of "pathological" pixels can be identified and be further characterized, at least with current and foreseeable manufacturing technologies.

Said key generation can be usefully used for authentication and/or ciphering of data, in particular to ensure confidentiality. The generated key also can be used as a signature (i.e. to sign a message).

Authentication designates the operation of identifying a computer device (e.g. by comparing collected identifiers). Authentication advantageously can be achieved by using a digital signature algorithm (random key and random/unpredictable nonce). In some embodiments, authentication can be enabled by using secret keys, used for example in algorithms such as Hash-based message authentication code or HMAC or block-cipher-based MAC or CMAC.

Ciphering refers to ability of protecting data e.g. by generating a secret (or private) key intrinsic to the imaging sensor and following to the consumer electronics device enclosing the imaging sensor. Asymmetric (private key and a nonce) or symmetric (secret key or stream cipher) encryption can be used.

Embodiments of the invention can advantageously be used for trusted computing (e.g. root of trust, i.e. hardware/software components that are inherently and initially trusted).

In some embodiments, a key can be used as a seed for a Deterministic Random Bit Generator (DRBG), also known as a pseudorandom number generator (PRNG).

In some embodiments, the presence of an embedded and accessible sensor (e.g. in a smartphone) can be leveraged. Advantageously, embodiments of the invention do not require additional hardware integration and/or modification of existing hardware, thereby does not increase manufacturing or operational costs.

Advantageously, embodiments of the invention allow protecting privacy and sensitive data. Some embodiments include secure login to a mobile website (e.g. email account, social account, banking account, etc), signature of emails or documents, mobile payment (e.g. crypto-currency or money transactions), and/or authentication of Internet of Things (IoT) devices (e.g. smartwatches, smartphones, smart-meters), healthcare applications, automotive applications (e.g. cars door controlling), logistics and supply chain management (e.g. for electronic devices) applications, machine-to-machine communications (M2M), robotics or domotics.

BRIEF DESCRIPTION OF DRAWINGS

Embodiments of the present invention will now be described by way of example with reference to the accompanying drawings in which like references denote similar elements, and in which.

DETAILED DESCRIPTION

Figure 1:
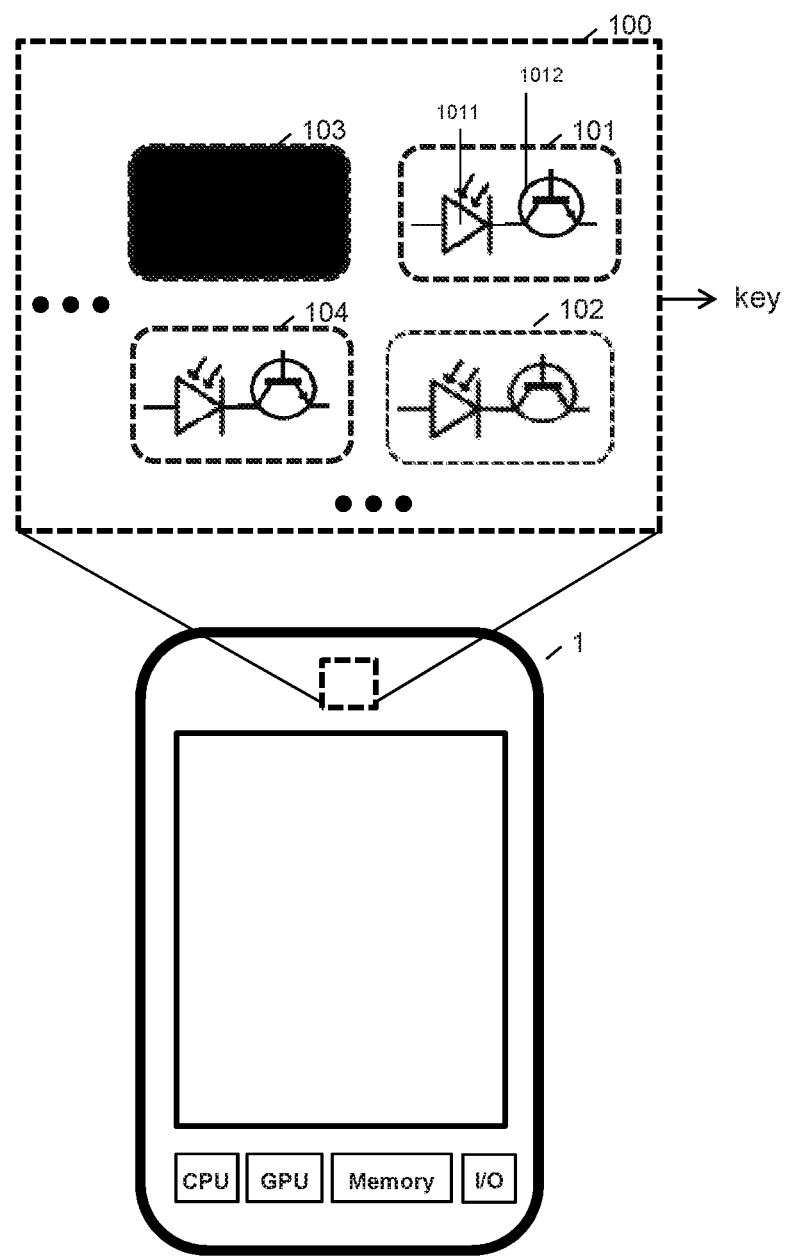
FIG. 1 shows a system view of an embodiment of the invention.

FIG. 1 shows a system view of an embodiment of the invention.

The figure shows a computer device 1 comprising an imaging sensor 100.

A "sensor" is an object or a device whose purpose is to measure or detect events or changes in its environment, and then provide a corresponding output. A sensor can monitor still images. A sensor also can monitor values of selected parameters.

In some embodiments, a sensor according to the invention can be an imaging sensor. An "image sensor" or "imaging sensor" is a sensor that detects and conveys the information that constitutes an image. Image sensors comprise for illustration purposes digital cameras, camera modules, medical imaging equipment, night vision equipment such as thermal imaging devices, radar, sonar, and others.

In some embodiments, a sensor according to the invention can be a time of flight (TOF) camera. Such a sensor does not construct an image per se but a matrix of distances.

In some embodiments, a sensor according to the invention may be a non-imaging thermal sensor, such as a bolometer. In some embodiments, a sensor can be a magnetic sensor, which can be turned into a matrix of measurements.

In the illustrated embodiments, the imaging sensor can be a CCD which can comprise a plurality of sensors, i.e. "pixels" or "photosites" (e.g. 101, 102, 103, and 104).

A pixel 101 comprises a photodiode (e.g. 1011) and one or more transistors (e.g. 1012). A "photodiode" is a semiconductor device which converts light into an electrical current. A pixel is connected to underlying electronics structure and additional electronics (e.g. amplifiers, etc).

In digital imaging, a "pixel" or "dot" is a physical point which is the smallest addressable element in an imaging sensor. A pixel considered by the invention can be "active" or "passive". An active-pixel sensor (APS) is an image sensor consisting of an integrated circuit containing an array of pixel sensors, each pixel containing a photo-detector and an active amplifier. The term "active pixel" sensor is also used to refer to the individual pixel sensor itself, as opposed to the image sensor (the image sensor can then be called an "active pixel sensor imager" or "active-pixel image sensor"). "Passive-pixel" sensors are pixel sensors without their own amplifiers or active noise cancelling circuitry (e.g. CCD, or TDI).

The figure further shows examples of a working pixel 101 (following the expected behavior or law), a "pathological" pixel 102 according to the invention, a "defective" pixel 103 and a "standard" or "working" pixel 104 (normal or average responses, among which outlier "pixels" can be selected).

"Pathological" pixels are advantageously leveraged by the present invention.

Pathological pixels are pixels which abnormally react to uniform and comparable inputs.

Pathological pixels comprise defective pixels.

Defective pixels are those which can be immediately tagged as faulty (at a macroscopic perspective, with natural cognitive perception). They may be considered in some contexts as being not functional. For example, defective pixels can be pixels that are not performing as expected or which fail to reproduce light levels. Examples of defective pixels comprise: dark dot defects (e.g. transistor in the transparent electrode layer that is stuck "on" or "off"), bright dot defects, partial sub-pixel defects (e.g. manufacturing defect in which the RGB film layer was not cut properly), tape automated bonding faults (e.g. connection failure leading to horizontal or vertical black lines), cold start (open circuit, leading to ghosting double or shadowing), stuck sub-pixels (pixel that is always "on"), dead pixels (all three sub-pixels are permanently off), etc.

Pathological pixels may not necessarily be reduced to defective pixels. They are not limited to such defects, as higher statistical moment order can also be considered. The abnormality criterion can dive into the properties of the signals indeed (order 1, order 2, and higher orders).

In some embodiments, pathological pixels (manipulated by the invention) including defective pixels may be used.

In some embodiments, pathological pixels—to the exclusion of defective pixels—can be used.

In an embodiment, pathological pixels can be defined as being pixels whose sum of the distances to all the other pixels of the subset (e.g. cumulative distance) is superior to a threshold, the distance between two pixels being determined by the difference of the $i^{th}$ statistical moment values of the two temporal distributions associated to these pixels obtained when taking the N images.

Advantageously, such a definition leads to reliable key generation. In addition, the determination or selection of the objects, i.e. the "pathological" pixels can become independent of the input (the uniform illumination conditions).

In some embodiments, one or more clustering steps can be used to select or determine said pathological pixels (or to select amongst pathological pixels having being determined at first). Depending on embodiments, clustering steps comprise connectivity-based clustering (hierarchical clustering), centroid-based clustering (e.g. k-means), distribution-based clustering (e.g. multivariate normal distributions used by the expectation-maximization algorithm) or density-based clustering (e.g. DBSCAN, OPTICS). Other models can be used, including group models, graph-based models, neural models. Hard or soft (also fuzzy) clustering can be used.

A "standard" or "working" pixel or "pixel" in short is a pixel which follow the expected Gaussian law (i.e. Law of large numbers). It presents the expected behavior (responses' profile or values). The Gaussian Law is associated to a residual dispersion of manufacturing processes and outputs for a same uniform input are spatially independently and identically distributed (regarding random variables).

An "imaging sensor" considered by the invention can be diverse.

Examples of image sensors' types manipulatable by the invention comprise semiconductor charge-coupled devices (CCD), active pixel sensors in complementary metal-oxide-semiconductor (CMOS), N-type metal-oxide-semiconductor (NMOS, Live MOS) technologies and others. APS sensors, comprising standard CMOS APS pixels, can be used in camera phones, in digital radiography, or in security cameras for example. CMOS type sensors are widely used, from digital photography to mobile phone cameras. A standard CMOS APS pixel comprises of a photodetector (a pinned photodiode), a floating diffusion, a transfer gate, reset gate, selection gate and source-follower readout transistor—the so-called 4T cell. The use of intrapixel charge transfer can offer lower noise by enabling the use of correlated double sampling (CDS). For applications such as large-area digital X-ray imaging, thin-film transistors (TFTs) can also be used in APS architecture.

In some embodiments, the imaging sensor can be a planar Fourier capture array (PFCA), which may be a camera composed of angle-sensitive pixels which requires no mirror, lens, focal length, or moving parts. One or more pixels manipulated by embodiments of the invention may comprise an angle-sensitive pixel (ASP), which is a light sensor made entirely in CMOS with a sensitivity to incoming light that is sinusoidal in incident angle.

In some embodiments, the imaging sensor can be a back-illuminated sensor, also known as backside illumination (BSI or BI) sensor.

An imaging sensor can be a CMOS camera sensor.

In addition to emission, a LED can be used as a photodiode in light detection.

A solar cell used to generate electric solar power is considered as a photodiode in the context of the invention.

Imaging sensors can be manufactured in a two-dimensional grid or array or matrix, or as a square or any shape, including three dimensional shapes. The matrix can be 1D (one dimension, a line) or 2D (a surface) or even 3D. Imaging sensors also can be in one dimension (in line). Examples of cameras comprise surveillance cameras used in "smart cities". Solar cells generally a plurality of layers, each filtering a range of wavelengths.

The "computer device" according to the invention may be any device using an imaging sensor, such as a smartphone or any consumer electronics device (e.g. laptop, smart watch, virtual reality or augmented reality device, game console, television, an Internet of Things device as well; for example a smart meter or washing machine in domotics; mecatronics components in automotive; medical devices or components in healthcare; elements for infrastructure e.g. smart city, transportation, logistics; banking devices in finance; etc).

The computer device may comprise diverse resources (computing resources CPU, memory or storage resources, graphical display resources GPU and communication resources I/O). Resources implement one or more of the described steps can be accessed remotely (e.g. in the Cloud or remote servers) and/or locally (in the computer device). In other words, for example, key generation can be triggered from a remote server and the computer device (as example a smartphone) can perform the steps to generate or verify the key.

Figure 2:
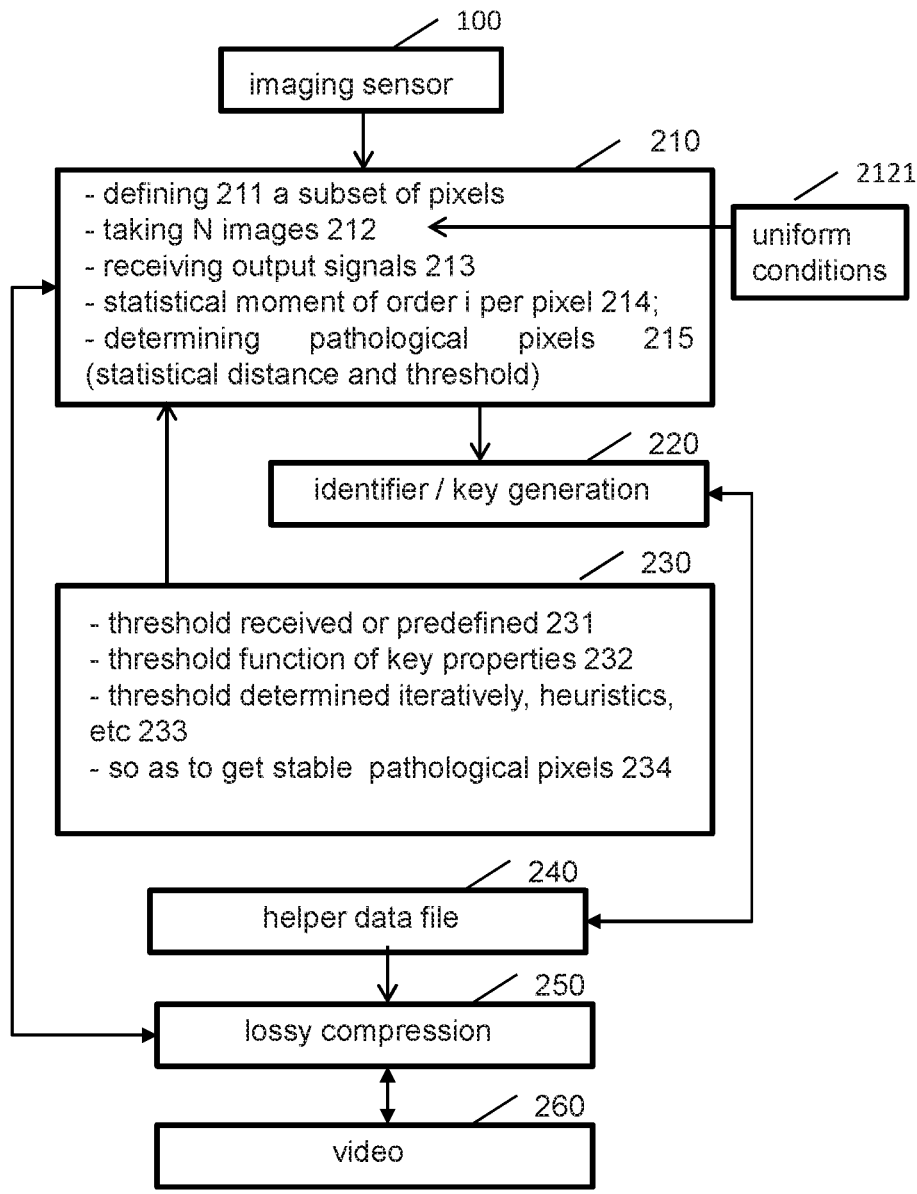
FIG. 2 illustrates examples of steps of the method according to the invention.

FIG. 2 illustrates examples of steps of the method according to the invention.

In an embodiment, there is disclosed a method of handling a sensor, the method comprising the steps of: defining a subset of sensor components of the sensor; challenging said subset of sensor components under uniform conditions; receiving output signal values from said subset of sensor components; for each component of the subset of sensor components, determining the statistical moment of order i of the temporal distribution of the output signal value of said each sensor component; determining one or more pathological sensor components, said pathological components being components whose sum of the distances of values to all the other components of the subset is greater than a threshold, the distance between two sensor components being determined by the difference of the $i^{th}$ statistical moment values of the two temporal distributions associated to the components obtained when challenging said subset of sensor components under uniform conditions.

In some embodiments, no formed "images" are required.

The "sensor" manipulated by the invention can designate a broad range of sensors. A sensor produces or reflects ou outputs or provides values or samples or acquisition values or measurements.

The digitalization of the society leads to a fast-growing development of contactless technologies, which not only interconnect human beings, but also objects between themselves. This phenomenon is called Internet of Thinks (IoT): it is anticipated that ten times more machines will exchange information over interconnected networks, such as Internet or 4G/5G networks, than human beings. These objects are meant to collect information and, possibility, react on the real world. Information collection is important for IoT devices, to report meaningful status and awareness about their environment. Nowadays, a significant amount of measurements updated on-the-fly make up big data. Big data has value only if it has a high veracity, meaning that it can match well the environment in terms of reliability and accuracy of the collected measures. Thence, many devices with many diverse sensors are being and will be deployed. For improved veracity, multiple sensors are deployed, so as to collect multivariate (hence more rich) information (e.g., in various directions, or same instances of sensors placed at different locations, etc.), and which is in addition redundant, for an enhanced resistance to failure, and also to further increase the signal-to-noise ratio by diversity. As a consequence, IoT devices progress towards commoditization, which many sensors, aimed at being resilient. This in particular implies that there are many different venues to get the results of the "same" measurements (the goal of the variety of sensors is diverted to be used as a measurement of the measurement sensors themselves, all things being equal.

In some specific embodiments, the "sensor" manipulated by the invention may be an "imaging sensor". In an embodiment, the sensor is an imaging sensor and a sensor component is an active pixel, the imaging sensor thereby comprising a plurality of active pixels.

In an embodiment, the step of challenging the subset of active pixels under uniform conditions comprises the step of acquiring a plurality N of images. In an embodiment, the challenge can be to acquire a plurality of images.

In an embodiment, the sensor is a combination of independent sensors. For example, in some embodiments, a unique camera sensor can be used. In some embodiments, the challenge of the subset of pixels can be performed under spatially uniform conditions. For example, given a unique camera sensor, the illumination conditions can be specific (see infra). In some embodiments, the subset can comprise sensor components e.g. pixels of different devices, these devices being independent and being placed in the same uniform conditions or spatially uniform conditions (see infra for the meaning of uniformity).

In an embodiment, the method further comprises the step of generating an identifier from the determined pathological sensor components.

In an embodiment, the method further comprises the step of comparing the generated identifier and/or hash value thereof with at least another identifier to authenticate the sensor.

In an embodiment, the threshold is received or predefined.

In an embodiment, the threshold is function of one or more desired properties of the generated identifier, said properties comprising bit length and/or bit error.

In an embodiment, the number output signal values received from said subset of sensor components and/or the threshold is set so as to determine repeatedly the same pathological sensor components for a given statistical order i.

In an embodiment, at least some partial information about coordinates of pathological sensor components can be stored in a helper data file.

In an embodiment, the sensor is an imaging sensor and uniform conditions are spatially uniform conditions obtained by closing the shutter associated with the imaging sensor.

In an embodiment, the sensor is an imaging sensor and uniform conditions are spatially uniform conditions obtained by grounding out the photodiodes associated the pixels of the subset of pixels.

In an embodiment, the sensor is an imaging sensor and uniform conditions are spatially uniform conditions obtained on the subset of pixels by adjusting the light source and/or by shaping the light beam.

In an embodiment, an image is in a lossy compression format.

In an embodiment, an image is a video frame.

There is disclosed a system configured to handle a sensor, comprising: a processor or a circuit configured to define or to receive information about a subset of sensor components of the sensor, said subset of sensor components being challengeable and/or challenged under uniform conditions; a receiver or circuit or processor configured to receive output signal values from said subset of sensor components; for each component of the subset of sensor components, the processor or circuit being configured to determine the statistical moment of order i of the temporal distribution of the output signal value of said each sensor component; the processor being further configured to determine one or more pathological sensor components, said pathological components being components whose sum of the distances of values to all the other components of the subset is superior to a threshold, the distance between two sensor components being determined by the difference of the $i^{th}$ statistical moment values of the two temporal distributions associated to the components obtained when said subset of sensor components is challenged under uniform conditions.

In an embodiment, the processor is further configured to generate an identifier or a key from the determined pathological pixels.

Other embodiments, specifically directed towards imaging sensors, are now described.

In an embodiment, there is disclosed a computer-implemented method of handling an imaging sensor comprising a plurality of pixels, the method comprising the steps of: defining a subset of pixels of the imaging sensor; taking N images while challenging said subset of pixels under spatially uniform conditions; receiving output signals from said subset of pixels; for each pixel of the subset of pixels, determining the statistical moment of order i of the temporal distribution of the signals of said each pixel for the N taken images; determining one or more pathological pixels, said pathological pixels being pixels whose sum of the distances to all the other pixels of the subset is superior to a threshold, the distance between two pixels being determined by the difference of the ith statistical moment values of the two temporal distributions associated to the pixels obtained when taking the N images.

Here is described a computer-implemented method of handling an imaging sensor 100 comprising a plurality of pixels, the method comprising the steps of: defining 211 a subset of pixels of the imaging sensor; taking 212 N images while challenging said subset of pixels under spatially uniform conditions; receiving 213 output signals from said subset of pixels; for each pixel of the subset of pixels, determining 214 the statistical moment of order i of the temporal distribution of the signals of said each pixel for the N taken images; determining 215 one or more pathological pixels, said pathological pixels being pixels whose sum of distances to other pixels of the subset (cumulative distance) is superior to a threshold, the statistical distance being determined between temporal distributions of signals of pixels of the subset of pixels.

In some embodiments, the output signal of each pixel can be determined (measured and/or computed). In some embodiments, the output signal can be obtained or received by design of the circuit constituting the considered sensor. In some embodiments, such information can be obtained by modifying the electronics (e.g. probes). In some embodiments, output signals can be deduced or otherwise computed.

The term "defining" 211, used previously, underlines that the choice of pixels (composing the subset of pixels which will be further handled by steps of the invention) may in fine be arbitrary. For example, the subset can be user-defined and/or random and/or selected by a third party (e.g. machine or algorithm), etc. The subset of pixels is the pool of candidate pixels, which will be further considered or manipulated.

Regarding the "subset of pixels", theoretically, the larger the subset of pixels the more malfunctions in the manufacturing process can lead to "pathological" pixels. In some embodiments, knowledge about the imaging sensor and pixels thereof (e.g. manufacturing weaknesses, for example received as metadata) and/or other reasons (e.g. pixels remaining in shadow when the shutter is opened) can lead to select one or more specific subsets.

In an embodiment, the defined subset may be the entire matrix or array of pixels of the imaging sensor (upped bound included). In some embodiments, the subset of pixels can comprise one or more rows (lines) and/or one or more columns of the imaging sensor. In some embodiment, the subset of pixels can comprise pixels forming lines, diagonals, squares, rectangles, ovals, ellipses, etc. The subset of pixels can comprise patterns, i.e. regular repetition of motifs. Pixels can be contiguous, or not. In some embodiments, if available, unexposed pixels (e.g. those remaining in the dark even if the shutter is opened) may be used to implement the invention.

The considered subset(s), when being smaller in surface than the entire matrix, may advantageously lead to improved performances (in particular faster discovery/enrollment and/or faster challenge-response times).

The expression "taking N images" 212 can be interpreted in that an image acquisition process is performed on or after a triggering action. In fact, the triggering action in itself is indifferent. Different triggering schemes are possible. In an embodiment, the acquisition can start once appropriate spatially uniform conditions are met. In some embodiments, image acquisition is continuous and images are filtered out after that the uniformity of acquisition is assessed. Image capture also can be conditional to user action. In some other embodiments, image acquisition can result from continuous evaluation of environmental conditions and obtained results (including results obtained progressively or on-the-fly, or given detected post-processing operations). In some other embodiments, a specific scene, a known or calibration configuration can be used as a reference for the acquisition.

Regarding the number of images to be taken, different compromises can be made, depending on operational parameters, for example between acquisition environment (e.g. temperature drifting, available duration to take images, shutter speeds, memory available, etc), target key length, available/discoverable pixels, reliability target of the generated key, etc. Different types of cameras may be used. For instance, some of those cameras manipulate signals over time, without the notion of (formed) images, for example "timing cameras".

Different phases can be distinguished. While a high number of images can be taken at or during enrollment (to determine and characterize pathological pixels), a limited number of images may be required at run-time (to query or challenge known pathological pixels in order to determine the identifier). Thanks to helper data files which optimize pathological pixel research without revealing anything about the identifier, the number of required image can advantageously be reduced.

In an embodiment, the method is "burst-less", i.e. does not require a plurality of images to be taken at run-time. In an embodiment, the method can use a "burst" of images (a plurality of images taken in the same conditions of illumination, possibly during a short timeframe). This plurality of images can provide the data which can be leveraged to identify pathological pixels.

The term "challenging" expresses that the underlying sensors (pixels made of photodiodes and transistors) can be "excited" or "solicited" or "queried" or "tested" or "interrogated" or "questioned". In some embodiments, such challenge can take the form of an illumination or enlightening.

The subset(s) of pixels are placed into spatially uniform conditions 2121. The expression «spatially uniform conditions» is now briefly discussed.

The term "spatially" underlines the spatial nature of the physical parameters being considered (for example photons reaching out the matrix of pixels of the imaging sensor, grounding out conditions), also in opposition to the reference of temporal parameters (noise in particular, i.e. the evolution of excitation of pixels over time).

The term "uniform" thus refers to the distribution in space of inputs. Depending on embodiments, some definitions out of general dictionaries can be applicable ("identical or consistent from place to place", "without variations in detail", "unvarying", "undeviating", "occurring in a manner independent of some variable"). For example, photons can reach out the matrix of photodiodes in no privileged direction.

Output signals (of pixels) are voltages. In some embodiments, inputs can be photons (when challenging photodiodes of pixels). In some other embodiments, pixels or transistors associated with photodiodes can be grounded out (literally inputs are reduced to zero). In other words, uniform "illumination" can be determined electronically. The term "uniform" can thus refer to photons and/or to the lack of photons (i.e. grounding out conditions). The expression «spatially uniform conditions» thus can mean «spatially uniform illumination conditions» and/or «spatially uniform grounding-out conditions». It can be noted that embodiments may not be mutually exclusive: absence of illumination, low illumination, controlled illumination, and grounding out conditions can be combined (for example for a subdivided matrix of pixels). Pixels can selectively be grounded out and/or illuminated.

According to a perspective oriented towards energy, it can be defined that each pixel (i.e. the photodiode associated with said pixel) of the selected subset of pixels receives substantially the same amount of energy during image acquisition time ("integration time"). The quantity "energy" (received by the matrix of pixels and thus by the subset of pixels) corresponds to the number of photons multiplied by h (Planck constant) times nu (frequency). Each of the considered pixels receives substantially the same amount of energy. The term "substantially" refers to the fact that photons cannot usually be counted exactly and/or strictly controlled experimentally. The very quantum nature of these systems also implies fundamental quantum uncertainties.

The expression «spatially uniform conditions» reflects the underlying principle that small fluctuations of experimental (illumination, grounding-out) conditions shall or do not induce noticeable variations of amount of energy received by pixels. The total energy received by the sensor (all pixels) is consequently assumed to be the same. Even if local fluctuations can occur (some pixels can temporarily receive more energy, some less, there are quantum effects, etc), these variations of uniformity will not change the total energy received over integration time. Statistically, each pixel receives the same amount of energy. In some embodiments, the transfer function of the sensor is used (relation between input and output).

Within said boundaries ("substantially the same amount of energy received per pixel during image acquisition time"), various macroscopic variants can be performed. In the end, such temporal distribution of energy is indifferent.

In an embodiment, the method comprises a step of determining 215 one or more "pathological" pixels, said pathological pixels being pixels whose sum of the distances to other pixels of the subset is superior to a threshold, the sum being determined between temporal distributions of signals of pixels of the subset of pixels.

"Pathological" pixels are now discussed. The terminology used designate pixels which abnormally react to uniform and comparable inputs. Pathological pixels comprise—but are not limited to—so called—"defective" pixels.

Pathological are not limited to such defects, as higher statistical moment order can be considered. The abnormality criterion can dive into the properties of the signals indeed (superior moment orders).

At moment order 1 (i=1), the output voltage value is considered. In such a case, pathological pixels are those whose outputs are notably offset with respect to the others or even independent of the input, for example but not exhaustively stuck pixels or bright dots or dark dots.

At moment order 2 (i=2), the standard deviation of the temporal distribution is considered. Pixels which are agitated and/or which flicker and/or which are unstable and/or which are noised are then considered and leveraged.

At higher moment orders, distribution properties can be advantageously leveraged.

Skewness (i=3) designates the measure of the asymmetry of the probability distribution of a real-valued random variable about its mean. The skewness value can be positive or negative, or undefined. The qualitative interpretation of the skew is complicated and unintuitive. Advantageously, as real data points may not be perfectly symmetric, the determination of the skewness of the dataset indicates whether deviations from the mean are going to be positive or negative. Such a property can be determined and further leveraged to determine pathological pixels, in turn leading to key generation. Measures of skewness comprise Pearson's coefficients, quantile-based measures, L-moments, distance skewness, Medcouple, etc.

Kurtosis (i=4) is a measure of the "tailedness" of the probability distribution of a real-valued random variable. In a similar way to skewness, kurtosis is a descriptor of the shape of a probability distribution. Several ways of quantifying kurtosis are possible.

Noticeably, pathological pixels are pathological within small variations of the chosen input. Quantitatively, input values can advantageously be selected knowing the nature of the "pathological" pixels (e.g. black or the absence of photons is more efficient to determine hot pathological pixels). The optimal input illumination can either maximize the number of selected pixels or the reliability of the identifier extraction (measuring the bit error rates for multiple generations).

The statistical characterization according to the invention (i.e. handling statistical moments of order i of the temporal distribution of signals) is advantageous in that it allows to deep dive into the properties of the imaging sensor and its constituents and to possibly extract a signature that can be both unique and possibly reproducible.

Taking a plurality of images increases the "knowledge" about each pixel (its "behavior").

Taking a plurality of images indeed allows handling statistical analysis, in particular to estimate statistical moments (i.e. moments of orders 1 to n can be determined). The higher number of images the better confidence interval of the statistical moment estimation. Hence taking a high number of images ensures that temporal noise does not influence the selection of pixels. The more images, the more precise the knowledge of the distribution, the better pathological pixels can be determined. The statistical moment of order "i" can refer to the number of images to be taken.

To estimate the $i^{th}$ order statistical moment with a finite confidence interval, a sufficient number of images are required. For example, with one single image, the pixel output value is the better estimation of the statistical moment of order i=1 (mean) but the confidence interval depends on the width of the statistical distribution ($2^{nd}$ order statistical moment). However, with one single image, variance or ($2^{th}$ order statistical moment) is at best steadily equal to zero or meaningless. Hence in an upstream sensor characterization phase, a high number of images could be acquired to precisely determine the statistical distributions of each pixel of the subset and then fix the number of images required in run-time to estimate the ith order statistical moment within a pre-determined and arbitrary small confidence interval.

Pathological pixels are not known a priori. Pathological pixels are indeed discovered (hidden absolute reality) or at least determined (relative truth) at enrollment phase (for example in the lab or the manufacturing facility). An exploration of the matrix may be performed (i.e. a «scan», in the meaning of exploring or analyzing the noise distribution and its intimate properties). Once discovered, coordinates of pathological pixels are known and may be exploited to generate an identifier (a key), which itself can serve for different purposes.

Pathological pixels according to the invention are likely to be found in low cost systems (e.g. Internet of Things devices, low end mobile devices), where the quality of the imaging device is not critical to those systems. Manufacturing processes controls for such devices are generally less strict and/or mature. By contrast, other types of pixels named "outliers" (not manipulated by the present invention) can be found in more expensive devices, where the imaging functionality can be considered as core or critical (e.g. precise cameras, televisions, tablets, etc). Such devices are generally manufactured according to higher standards and requirements. The manufacturing is generally better controlled. Residual dispersion of the manufacturing process is general independently and identically distributed (regarding variables).

In some embodiment, a threshold or range of thresholds can be used to determine one or more pathological pixels. In an embodiment, the threshold is stored or otherwise accessible. In some embodiments, it can be further protected, ciphered, encrypted and/or it can be updated on regular basis.

In some embodiments (for the order i=1), pathological pixels can be determined according to a reference to an intermediate object, namely a statistical distance. Advanced distance evaluation can be performed by comparing not just the mean value of the two temporal distributions but by estimating the statistical distance between the two distributions. Such a reference distance advantageously allows for flexible developments of the invention (a statistical distance conveys broader consequences than a mere threshold). Examples of advantageous statistical distances comprise Kullback-Leibler divergence, Hellinger distance, total variation distance, Rényi's divergence, Jensen-Shannon divergence, Lévy-Prokhorov metric, Bhattacharyya distance, Wasserstein metric, Kolmogorov-Smirnov statistic, maximum mean discrepancy). Other alternative approaches than statistical distance may be considered (e.g. signal-to-noise ratio distance, Mahalanobis distance, energy distance, distance correlation, Łukaszyk–Karmowski metric).

When handling statistical of higher moments (i.e. i>=2, for example deviations), numerical values can be compared by pairs and the "statistical distance" is reduced to a (mere) difference. This statistical character surfaces in the expression «difference of the ith statistical moment of the temporal distribution».

In the description above, it is important to notice that the described steps are not necessarily ordered in the way they are described therein. For example, images can be taken first and the subset of pixels can be defined afterwards.

Helper data files may be used to guide the search for appropriate pixels. The guide may consist in providing partial information on positions of pathological pixels. For a 128-bit key for instance, the probability that the $n^{th}$ bit is equal to 0 (resp 1) is equal to the conditional probability that the $n^{th}$ bit is equal to 0 (resp 1), knowing the additional information placed in the helper data file.

In an embodiment, the method further comprises the step of generating an identifier from the determined (pathological) pixels.

By design, such an identifier (or a "key") is generally unique and its determination can be made reproducible.

The coordinates of pathological pixels (information position) can be used to derive an identifier (a key). Many different methods can be used to derive an identifier from pathological pixels. A few examples are described hereinafter, considering one pathological pixel for simplification and illustration purposes only.

Given the 2 coordinates (Xi, Yi) of the considered pathological pixel i (for example Xi=450, Yi=1001), a first method can comprise the step of the considered pathological pixel i providing one bit, for example, the parity of Xi XOR the parity of Yi. In the provided example as the parity of Xi is 0 (pair) and of Yi is 1 thus the output is 0 XOR 1 thus 1. Numerous other methods can be applied (e.g. parity Xi XOR NON parity Yi).

Alternatively, a selected pixel can provide more than one output bit (n>1). The actual figure depends on dimensions of the imaging sensor. For example, for a sensor of 2464 by 3280 pixels on a surface, the working surface can be a square of $2^{11}$ by $2^{11}$ pixels (to maintain a symmetry between X and Y). Coordinates of the 4 194 304 pixels (2048 by 2048) can be encoded over 11 bits. For example Xi=450 can be written in base 2 (over 11 bits) as "00111000010" and Yi=1001 can be written as "01111101001". Many different methods can be used to generate a key. For example, strings Xi and Yi can be concatenated into 0011100001001111101001 (or into 0111110100100111000010, or interlaced, or XORed, or otherwise composed). As a result, a string of 22 bits of information can be obtained.

In an embodiment (which can be applied or combined with any of the preceding steps), information position on Xi can be stored in a helper data file (in clear, or as a secret) and Yi can be coded over M bits (as described above): this will allow to get a key of M bits.

In some embodiments, information position may not use coordinates (Xi, Yi) referential. As other coordinate systems are possible, the origin (referential center) can be chosen arbitrarily. For example, bit signs can be used: pixel (1,1) can be located anywhere on the matrix or array of pixels. As a consequence, the steps to extract a key may be diverse.

Key extraction more generally can result from (i) arithmetic and logical operations performed on the parity of the coordinates of the plurality of the pathological pixels, and/or from (ii) logical operations and/or combinations of output bits obtained by encoding in base 2 of the coordinates. Optionally, part of the information (i, ii) can be stored in a helper data file. Optionally, values of coordinates (i, ii) can be changed depending on the reference system.

It should be noticed that a key may be extracted from one or more of such pathological pixels. In other words, an optional selection step can be performed, consisting in selecting a set of pathological pixels among those having being determined (i.e. a further selection), in order to derive a key or identifier from said (second) selection. Advantageously, the way to handle the latter selection may be secret, for example to further protecting the generated key.

The preceding methods and options having described can be set as to extract key(s) from the knowledge of the pathological pixels according to the invention. It is underlined that numerous variants of extraction are possible. Once known and kept stable, the key extraction can allow extracting reliably the same key out of the imaging sensor.

A given key is obtained from the knowledge of pathological pixels and of a set of arbitrarily but deterministic sequence of steps applied to a selection of pathological pixels.

In some embodiments, the generated key can be stored or cached (and further checked on demand, for example for a secure transaction such as a payment application or the like).

In some embodiments, the generated key is not stored as, in some situations, storing a generated key can raise security issues. In some embodiments, the SPUF ("synthetic PUF") generated according to the invention is challenged each and every time a key is needed. Key requests/generation can occur at a high rate (for example a key each second, as it may be required by a payment platform). In some embodiments, the generated key can be stored or securely stored (using for example a cache mechanism).

As examples of typical orders of magnitude, enrollment performed at manufacturing can be performed in matter of seconds or minutes (considering hundreds, thousands, if not millions of images for very stable isolation of pathological pixels); at runtime, knowing partial information on the e.g. 5-10 addressable stable pathological pixels, query time can be a fraction of a second (e.g. few milliseconds). Signal analysis can be very brief, as the time required depends mainly on the acquisition of the N images.

In some embodiments, the method can comprise a step of seeding a Pseudo Number Random Generator with said generated identifier. Such an embodiment can be advantageously considered as a backup or fallback or substitute for a True RNG (which provides a different true random value at each query).

In an embodiment, the method further comprises the step of comparing the generated identifier and/or hash value thereof with at least another identifier to authenticate the imaging sensor.

Such an identifier can serve different purposes. For example, an identifier can be used to identify a computer device, i.e. by generating a secret which is intrinsic to the computer device consumer electronics (comprising the imaging sensor, itself comprising the pathological pixels). By comparing (e.g. published, shared, etc) identifiers, authentication may be ensured. Many downstream applications can be further enabled (for example a payment platform can allow a transaction conditional to the retrieval of the appropriate identifier on the device, a software license check can use such a verification, etc).

In an embodiment, the threshold 230 is received or predefined (231).

In an embodiment, the threshold can be given, i.e. received from another trusted user or machine entity. The threshold can be predefined, for example locally accessible (e.g. stored in a memory accessible to the processor handling data to characterize pathological pixels).

In an embodiment, the threshold 230 is function of one or more desired properties of the generated identifier, said properties comprising bit length and/or bit error (232).

To determine the threshold, methods related to graph analysis may be applied. One example could consist in determination of overlaps and maximization of differences between samples values, (i.e. to find pixels as different as possible but while maximizing the bit error rate and getting stable pixels).

In some embodiments, the threshold can be determined (233), and not predefined and/or computed.

The determination or calculation can be performed in different ways: iteratively, by dichotomy, by applying heuristics, programmatically (i.e. computable as a result of an algorithm), analytically (i.e. computable by considering an analytical function the sum of differences for i>=1 or sum of statistical of statistical distances eventually for the specific case i=1). The selection criterion can be iteratively increased or decreased. Machine learning or clustering algorithms (k-means) can be used. In the case of a clustering strategy, the threshold is linked to the centroid distance between the more populated cluster ("non-pathological pixels") and others single or few pixels clusters which are precisely the ones pathological.

The "controllability" of the system (e.g. the ways the system can be controlled, or to what extent) considered by the invention is complex and can be manipulated in various ways. Downstream objectives can pilot or guide or influence or determine upstream parameters. Multi-objective optimization can be performed. Requirements or constraints or objectives can be given for various reasons (e.g. operational constraints, time available for image acquisition, renewals of keys e.g. every 250 milliseconds, desired reliability of keys, etc)

For example, to get a 128 bits key, a number n1 of pixels can be needed, and following N1 images can be needed for reliability requirements (N1 can determine the confidence interval of the ith order moment estimation). According to another example, given that N2 images can be taken in operation and that 6 pathological pixels have been previously discovered in the considered example, it can be determined that a key with a maximal length of 256 bits can be obtained. According to another example, it can well be that the number of images that can be taken can be limited: in turn this will limit the number of reliably selected pathological pixels and so the key size which can be obtained. The threshold or statistical distance can be set so as to maximize the reliability of the generated identifier. The term "reliability" refers to repeated and multiple key generations: the number of errors (non-repeatedly constant) bits can be chosen arbitrary small. The required bit error rates (which precise values can depend on the envisioned application) can directly influence the number of required images N.

In an embodiment, the number of images N and/or the threshold is set so as to determine repeatedly the same pathological pixels for a given statistical order i.

In an embodiment, the statistical distance and/or the associated threshold is set so as to determine reliably the N1 pathological pixels (234).

In an embodiment, the enrollment phase may be repeated so as to determine the stable pixels, i.e. those which are consistently selected.

The term "reliability" refers to the fact that the same—physical—pathological pixels (i.e. same coordinates, same positions, named "steady pathological pixels") will be determined if queries are repeated over time, preferably under the same spatially uniform conditions. It means that whatever the pixels, the same pixels can be identified. It is indifferent to obtain a same number of pathological pixels if these change: it is required that the exact same individual pixels are found. Experimentally, asymptotic convergence can be observed. Manipulating the statistical distance (or threshold or range of thresholds) can allow identifying these stable pathological pixels.

In an embodiment, at least some partial information about pathological pixels may be stored in a helper data file. In an embodiment, full or partial coordinates (e.g. locations or positions such as lines or column) of pathological pixels may be stored in a helper data file (240). These selected pixels can be later challenged. The helper data file can be burnt in the hardware and/or stored in software.

Advantageously, using a helper data file improves performances. Reliability is also improved because the interrogation of pixels is focused and avoids nearby or adjacent perturbations or hysterisis.

The knowledge stored in the helper data file is not sufficient for an attacker to reveal the key. Yet it can lead to significant improvements in performances at run-time (scan time is reduced but secret of the key is preserved). The probability of outputs bits given this helper data file information is a conditional probability: would an attacker know it, he wouldn't have more probability to find the secret key. For example, the number of images N and the list of abscissa or ordinates of the selected pixels can be stored for higher performances, without revealing anything about the selection criterion on itself and about the positions of the selected pixels. The probability that the nth bit is equal to 0 (resp 1) is equal to the conditional probability that the $n^{th}$ bit is equal to 0 (resp 1), knowing the additional information placed in the helper data file.

In an embodiment, spatially uniform conditions 2121 are obtained by closing the shutter associated with the imaging sensor.

In an embodiment, uniform illumination can be obtained by closing the shutter associated with the imaging sensor. In addition or alternatively, the imaging sensor can be placed in a black box (or room), limiting or preventing the presence of photons.

In an embodiment, the imaging sensor can be partly exposable to light while borders of the sensor can remain permanently in the shadow. The latter part can be exploited to perform steps of the method, e.g. without even the need for special illumination conditions and also in a continuous manner. In an embodiment, a first key (or part of key) is supported by the borders of the imaging sensor while a second key (or part of key) is supported by the matrix exposable to photons.

In an embodiment, spatially uniform conditions are obtained by grounding out the photodiodes associated the pixels of the subset of pixels.

In an embodiment, spatially uniform conditions are obtained on the subset of pixels by adjusting the light source and/or by shaping the light beam.

The light source can be a laser for example (e.g. LED). Internal signal modulation can be used (e.g. power modulation, wavelength, stroboscopic modes). Various optics and masks can be used (e.g. optical masks and/or mechanical masks, optics such as lens or beam shaping devices applied to one or more lighting sources, said lighting sources delivering photons of configurable wavelength). In an embodiment, a predefined graphical "mask" is applied (e.g. chessboard, patterned image, subdivided parts of the matrix is selectively challenged, e.g. those pixels of the shadowed part are solicited). A configurable mask can be placed in front of the imaging sensor when taking pictures. The mask may comprise pattern (e.g. lines, grids, chessboard, etc).

In an embodiment, an image is in a lossy compression format (250).

Embodiments of the invention can address lossless compression but also lossy compression algorithms used in images. Lossless compression is a class of data compression algorithms that allows the original data to be perfectly reconstructed from the compressed data (for example HEIF for images or FLAC for audio signals). Being unmodified, pixel signals can be analyzed and noise manipulation can allow efficient key extraction. Lossy compression permits reconstruction only of an approximation of the original data.

A lossy compression algorithm can affect the first moment order but remains indifferent at higher orders.

In an embodiment, raw data is handled (i.e. no compression, signals output by pixels without post-processing). The expression "raw data" designates data associated with each pixel without post-processing. In modern imaging sensors embedded in consumer electronics, access to raw data is generally possible using software. For example, raw data files can be stored on SD cards in .RAW format.

In some specific imaging circuits however, access to RAW data files may be complicated, as post-processing steps can be applied directly in hardware to the signals captured by pixels. For example, functions such as "LSC" and/or "spot pixel compensation" can occur and can affect the raw data, adding undesirable noise to the signals captured by pixels. A bypass is to get access to raw data at hardware level. The method also can be robust to some of these post-processing steps. Post processing of the signals output by pixels can affect spatial noise (distribution). Pre or post processing=off-chip lossy compression e.g. JPEG, video encoding MP4, in-chip hardware Channel Double Sampling. The claimed method by handling statistical moments of higher order of the temporal noise is robust to said pre/post processing affecting spatial distributions (values can be centered, distributions can be shifted, etc).

In an embodiment, an image is a video frame 260.

The acquired images or parts thereof can be video frames. Video compression algorithms and codecs combine spatial image compression and temporal motion compensation. Like the preceding observation regarding lossy compression, these video compression and compensation algorithms do not bar the invention to work. Advantageously, current imaging sensors in consumer electronics devices typically can take up to 30 images per second, if not considerably more. Such orders of magnitude allow getting interesting key lengths and this rapidly.

In an embodiment, the method can comprise a step of detecting or determining post-processing step applied to one or more images is detected. The method in turn can operate at higher moment order (e.g. plus one): advantageously, a key can still be extracted from the imaging sensor outputs. In order words, technologies like Channel Double Sampling (CDS) can be implemented in hardware and can obfuscate the properties of individual pixels. In such a case, the analysis of moments of superior order may allow to perform steps of the method and to still generate keys.

PUFs are now briefly discussed. A PUF is known to be a Physically Unclonable Function, i.e. a hardware function providing a response when a challenge is applied to the considered piece of hardware. It is to be underlined that the very definition of this technical object or embedding "Physically Unclonable Function" is still intensely debated, amongst persons who can be qualified as "skilled persons in the art". For example, associated properties of a PUF (e.g. "reliability" or "unclonability" properties) are subtle and therefore debated. The term PUF in fine appears to be a naming convention, not yet standardized, which lacks stable and clear definition. As an emerging property, the method steps might match some of the properties of a PUF. This does not mean that embodiments of the inventions equate a PUF.

Fixed-Pattern Noise (FPN) is now briefly discussed. FPN designates the noise on digital imaging sensor. The invention fundamentally differs from FPN and related techniques. At least two aspects can be mentioned.

First, FPN manipulates output values of pixels, i.e. at moment order 1. By contrast, the invention goes beyond FPN, as it generalizes to statistical moments of higher order. According to the invention, the selected pixels are those which are the most abnormal given a selection criterion which operates at a moment of order N with respect to a threshold, said threshold being empirically determined (for example iteratively, heuristics, machine-learning, clustering, graph algorithm, etc). This comparison allows extracting a number of bits as desired. Given a given reliability performance (e.g. determined bit error rate), experimental data results indicate that the reservoir of candidate pixels is larger than the necessary number of pixels to construct key with standard key length in the industry (128 up to 4096 bits).

Second, FPN considers the spatial noise (in pixels' output signals), which is not considered by the present invention (in terms of space, the considered aspect relates to the input and not to the output). Whatever the FPN, embodiments of the invention do consider pathological pixels, i.e. pixels which abnormally react to uniform and comparable inputs. The abnormality criterion can require "diving into" or invoking the properties of the output signals (order 1, order 2, and higher orders). To some extent, embodiments of the invention rely on the fact (or hypothesis) that pathological pixels appear randomly in or on the imaging sensor (homogeneously distributed on the surface given the dimensions of the imaging sensor). Some experiments have shown that this hypothesis is valid. The statistical law of interest is thus not the law of large numbers (imperfections of manufacturing processes of FPN) but a uniform repartition of rare events.

Figure 3:
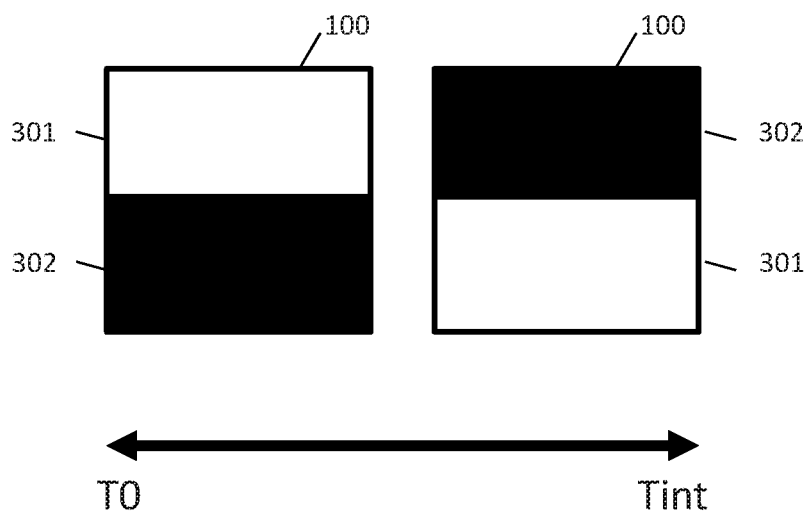
FIG. 3 illustrates an example of uniform conditions.

In an embodiment, there is disclosed a system configured to handle an imaging sensor comprising a plurality of pixels, said system comprising: a processor configured to define or to receive information about a subset of pixels of the imaging sensor; the imaging sensor being configured to take N images while challenging said subset of pixels under spatially uniform conditions; a receiver configured to receive output signals from said subset of pixels; for each pixel of the subset of pixels, the processor being configured to determine the statistical moment of order i of the temporal distribution of the signals of said each pixel for the N taken images; the processor being further configured to determine one or more pathological pixels, said pathological pixels being pixels whose sum of the distances to all the other pixels of the subset is greater than a threshold, the distance between two pixels being determined by the difference of the ith statistical moment values of the two temporal distributions associated to the pixels obtained when taking the N images. In an embodiment, the processor is further configured to generate an identifier FIG. 3 illustrates an example of uniform conditions.

As expressed by equation 310, over time [T0, T int] the considered pixels receive the same amount of energy: this leaves room for a wide range of energy distribution profiles over time. For example a subsets of the pixels 301 of the imaging sensor 100 (or part of it) can receive much more energy or light at start while some other 302 can remain in the dark, then the situation can evolve and be reversed: at the end of integration time/image acquisition time interval [T0, T int], pixels will have had received the same amount of energy. Various energy distribution profiles can thus be implemented.

In mathematical terms (equation 1), $$\forall\,(i,j)\in\Omega,\;E_{i,j}\int_0^{T_{int}} e_{i,j}(t)dt = E_\Omega \text{ independant of } (i,j)$$

wherein $e_{i,j}(t)\,dt$ is the energy received by the photodiode during the time dt, hence $$e_{i,j}(t)dt = N_\nu(i,j)\times h\nu$$

wherein $N_\nu$ (i, i) is the number of incident photons of frequency v on the photodiode of pixel (i, j) and h represents Planck constant.

Experimental macroscopic conditions (e.g. image acquisition triggering, stability, alignment, illumination conditions) can be controlled to some extent (for example, temperature of the device comprising the imaging sensor can evolve over minutes; image acquisition being performed significantly faster can be indifferent to temperature changes). At least, experimental conditions can be mitigated and tradeoffs can be found. Independently, at photonic level, the exact distribution of photons onto the matrix of pixels is not controllable as such (the exact number of photons received by each pixel cannot be measured and a fortiori controlled), so as the photoelectric conversion efficacy of each pixel (for example). Yet the associated aleas do not imply consequences, from a statistical standpoint. As a result, it is necessary and sufficient to place the considered pool of pixels (which are by definition adjacent to one another, i.e. placed in the same environmental conditions). For example, even if a few photons remain in the chamber containing the imaging sensor, uniformity condition can be met.

Given the requirement of uniform conditions, various corresponding embodiments are possible. Experimentally, uniform illumination conditions can be obtained by using various optical masking, beam shaping and/or light source adjustments. Uniform conditions also can be obtained by grounding out the photodiodes and/or transistors. In particular, illumination can be controlled to some extent: predefined color spaces for example may be used. The subset of pixels (e.g. imaging sensor) can be placed in the dark (no photons, i.e. shutter closed), or even reinforced dark (dark chamber in addition to closed shutter). Advantageously, measuring the noise of pixels at rest (without excitation, leak currents) optimizes or leverages the sensitivity of pixels. In some embodiments, rather than obscuring pixels, the subset can be saturated (e.g. flash), but the latter increases noise i.e. does not exploit sensitivity of pixels in an optimal manner, which degrees of freedom are constrained. In some embodiments, predefined color spaces can be used (for example yellow color values RGB 254 221 0). Such one or more intermediate colors can present advantageous tradeoffs (sensitivity due to manufacturing technologies, discovery time, query time, resulting reliability, etc). Sequence(s) of illuminations and/or colors can be used (e.g. dark, yellow, green, and dark).

There is disclosed a computer program comprising instructions for carrying out one or more steps of the method when said computer program is executed on a computer.

There is disclosed a system comprising means to perform one or more steps of the described method. In space, some steps can be performed locally and/or remotely (e.g. in the smartphone comprising the imaging sensors, possibly with some steps being performed in the network or in the cloud). Local execution can involve (specific/dedicated and/or generic) hardware blocks, and/or software. Corresponding hardware circuits can be distributed within the computer device, or gathered in a specific circuit. In time, some steps can be performed in the past (e.g. prior steps, "offline" execution, etc) and/or in the present time (e.g. "online").

In an embodiment, the method according to the invention can be implemented by an entirely embedded hardware block. In an embodiment, the disclosed method can be performed by embedded hardware and software running on a local processor. Some embodiments of the disclosed invention can be entirely hardware embodiments. Some embodiments can be entirely software embodiments. Some embodiments can contain both hardware and software elements. The invention also can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, and/or semiconductor system (or apparatus or device) or a propagation medium or the like.

The above figures and specification are provided for illustration purposes only and the above described embodiments may be combined when appropriate.

The invention claimed is:

1. A method of handling a sensor, the method comprising:
defining a subset of sensor components of said sensor;
challenging said subset of sensor components under uniform conditions;
receiving output signal values from said subset of sensor components;
for each component of said subset of sensor components, determining a statistical moment of an order i of a temporal distribution of an output signal value of said each sensor component;
determining one or more pathological sensor components, said pathological components being components whose sum of distances of values to all the other components of said subset is greater than a threshold, wherein the distance between two sensor components being determined by a difference of the $i^{th}$ statistical moment values of two temporal distributions associated to said components obtained when challenging said subset of sensor components under said uniform conditions, i including values greater than 2.

2. The method of claim 1, wherein the sensor is an imaging sensor and wherein a sensor component is an active pixel, the imaging sensor thereby comprising a plurality of active pixels.

3. The method of claim 2, wherein the challenging the subset of active pixels under uniform conditions comprises acquiring a plurality N of images.

4. The method of claim 1, wherein the sensor is a combination of independent sensors.

5. The method of claim 1, further comprising generating an identifier from the determined pathological sensor components.

6. The method of claim 5, further comprising comparing the generated identifier and/or hash value thereof with at least another identifier to authenticate the sensor.

7. The method of claim 5, wherein the threshold is function of one or more desired properties of the generated identifier, said properties comprising bit length and/or bit error.

8. The method of claim 1, wherein the threshold is received or predefined.

9. The method of claim 1, wherein the number output signal values received from said subset of sensor components and/or the threshold is set so as to determine repeatedly the same pathological sensor components for a given statistical order i.

10. The method of claim 1, wherein at least some partial information about coordinates of pathological sensor components are stored in a helper data file.

11. The method of claim 1, wherein the sensor is an imaging sensor and wherein uniform conditions are spatially uniform conditions which are obtained by closing the shutter associated with the imaging sensor and/or by grounding out the photodiodes associated with the pixels of the subset of pixels and/or by shaping the light beam.

12. The method of claim 1, wherein an image is in a lossy compression format and/or is a video frame.

13. A computer program product comprising computing instructions stored on a non-transitory computing storage medium for handling a sensor wherein when said computing instructions are executed are executed by one or more processors, configure said one or more processor to:
define a subset of sensor components of said sensor;
challenge said subset of sensor components under uniform conditions;
receive output signal values from said subset of sensor components;
for each component of said subset of sensor components, determine a statistical moment of an order i of a temporal distribution of an output signal of said each sensor component;
determine one or more pathological sensor components, said pathological components being components whose sum of distances of values to all the other components of said subset is greater than a threshold, wherein the distance between two sensor components being determined by a difference of the $i^{th}$ statistical moment values of two temporal distributions associated to said components obtained when challenging said subset of sensor components under said uniform conditions, i including values greater than 2.

14. A system configured to handle a sensor, comprising:
a processor configured to define or to receive information about a subset of sensor components of said sensor, said subset of sensor components being challengeable under uniform conditions;
a receiver configured to receive output signal values from said subset of sensor components;
for each component of said subset of sensor components, said processor being configured to determine a statistical moment of an order i of a temporal distribution of said output signal value of said each sensor component;
the processor being further configured to determine one or more pathological sensor components, said pathological components being components whose sum of distances of values to all the other components of said subset is greater than a threshold, wherein the distance between two sensor components being determined by a difference of the $i^{th}$ statistical moment values of two temporal distributions associated to said components obtained when said subset of sensor components is challenged under uniform conditions, i including values greater than 2.

15. The system of claim 14, the processor being further configured to generate an identifier or a key from the determined pathological pixels.

* * * * *